Oct. 22, 1963         I. NAXON         3,107,779
BALL FEED STORAGE MECHANISMS
Filed Oct. 2, 1959
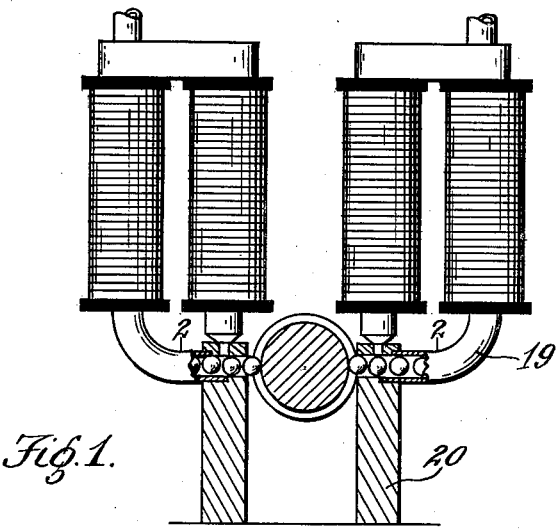
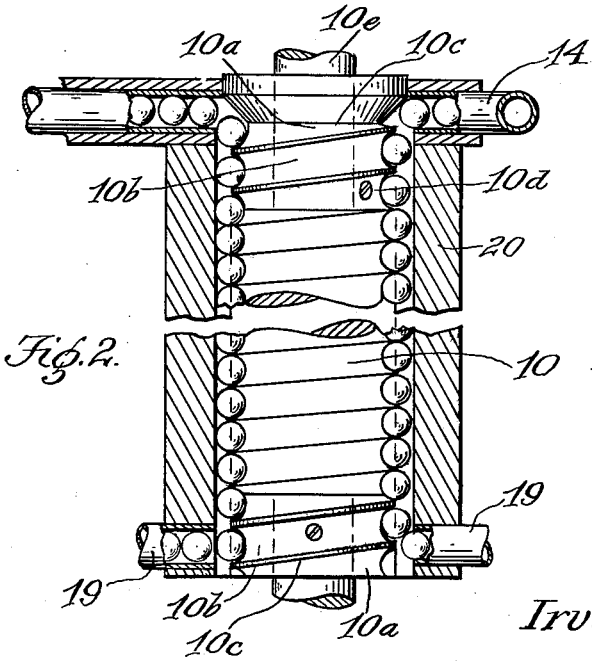
Irving Naxon
INVENTOR.
BY Stevens & Batchelor
Attorneys United States Patent Office 3,107,779
Patented Oct. 22, 1963

3,107,779
BALL FEED STORAGE MECHANISMS
Irving Naxon, 3003 W. Jarvis Ave., Chicago 45, Ill.
Filed Oct. 2, 1959, Ser. No. 844,011
5 Claims. (Cl. 198—213)

My invention relates to ball feed storage mechanisms and selective apparatus, and more particularly to a control apparatus for traveling electric signs and other applications, as covered in my Patent No. 2,817,703, dated December 24, 1957. In the patented structure, a magnetically controlled series of balls is delivered in consecutive order into the receiving end of a feed screw. The rotation of the latter moves the balls toward the opposite end of the feed screw, where they are transferred into a return conduit. The feed screw thread is in the form of a channel of approximately semi-circular cross-section; and the walls of the channel defining the spiral thread taper to a thin edge in order to keep the length of the feed screw at a minimum consistent with its thread-groove width.

In operating the above mechanism, I have found that the entering and departing zones for the balls in respect to the feed screw become subject to a reaction which does not occur along the intermediate portion of the feed screw. Thus, the impact of the balls—which are of hardened steel—with the initial and final convolutions of the screw thread imposes a forcible and frictional engagement by the balls with the thin edges of the thread, so that such edges become scuffed and worn down after the mechanism has been in use for some time. When it is considered that the ball feed must be accurate in all respects in order to transfer the character-forming impulses to the sign or other application with fidelity, it becomes apparent that irregularities at the ball receiving and delivering ends of the feed screw could develop imperfections and even serious errors in the character-forming factor of the mechanism.

In view of the above considerations it is one object of the present invention to provide means in the terminal regions of the feed screw which fortify the same against damaging action by balls entering and leaving the feed screw, so that the latter may accomplish its function uniformly throughout its entire length.

A further object is to provide means in the end portions of the feed screw which present thicker thread walls where the balls enter or leave the feed screw, so that such walls may withstand the influences of impact and wear by the balls where their travel imposes a factor of extra pressure, such as from behind in the entering zone and from above in the outlet zone.

An additional object is to construct the feed screw with special end pieces which are of a harder metal than is necessary for the screw itself, so that such end pieces may be made with final threads or convolutions which have the wear-resistant property of the harder metal.

Another object is to design the terminal pieces of the feed screw with threads of slightly faster pitch than the regular threads thereof, whereby to permit thicker thread walls to be made without appreciably increasing the length of the feed screw.

An important object is to accomplish the aforesaid improvement while retaining the one-unit construction of the feed screw, in order that its form and environment may not become involved or complicated.

With the above objects in view a better understanding of the invention may be had by reference to the accompanying drawing, in which—

FIG. 1 is a substantial duplication of FIG. 4 in the aforesaid patent; and

FIG. 2 is a section on the line 2—2 of FIG. 1, partly in elevation.

Referring specifically to the drawing, it is noted that the general structure of the ball feed is retained in the improved embodiment. Thus, this structure involves the supporting rails 20 for the ball conduits 19; and the feed screw 10 is mounted in the delivery zone of these to deliver balls into the initial thread groove of the feed screw.

It is apparent that the terminal portions of the improved feed screw are in the form of end pieces 10a which are screwed, as indicated at 10d, doweled or otherwise removably secured to the shaft 10e of the feed screw 10, whereby to form continuations of the same to all intents and purposes. However, it is also noted that the terminal threads 10b of the special end pieces—which follow the channeled form of the regular thread—have a slightly faster or more inclined pitch than that of the regular thread, although the terminal threads are in continuation of the regular one. Also, the terminal threads are defined by walls which do not come to the edge, but end in the relatively thicker form indicated at 10c. Thus, with the metal of the end pieces 10a made considerably harder than that of feed screw 10, it becomes apparent that this factor plus the thickened walls of the threads offer a far more durable support for the impact and travel of the balls than the edge-type thread walls. In practice I have found that by employing $\frac{7}{32}''$ balls for the body portion of the feed screw the same will have four threads per inch. Allowing a few thousandths of an inch clearance for ball accommodation, the major diameter of the screw is left with a thread apex anywhere from a sharp point to a flat top sufficiently under $\frac{1}{32}''$ to allow for the said clearance. However, as to the end pieces 10a, I have found—by employing a thread pitch of three turns per inch—that room will be had to strengthen the thread apex by widening the same to a $\frac{1}{16}''$ of greater flat top. This factor allows the equally important widening of the U-grooves for the end pieces 10a. Thus, the clearance for ball accommodation mentioned above can also be made much greater at the points where the balls enter and leave the feed screw. Obviously, mechanical or electrical irregularities will permit a ball to more easily fall into or leave a wide thread groove than one that fits the ball with but a very slight mechanical clearance.

As has been mentioned, the balls are under head pressure from behind when entering the feed screw as seen in FIG. 1; and the upper portion of FIG. 2 indicates that they are also subject to columnar down pressure at the discharging end of the screw. The special end pieces therefore counteract these pressures, as well as the hardness factor in the balls themselves. Also, the coarser threads in the end pieces, by virtue of the thicker thread walls, are more capable of withstanding the accelerated travel of the balls through the thread turn of the end pieces 10a.

It is now apparent that the improved feed screw has several advantageous features. First, it has the benefit of the terminal improvement without adding to the length of the feed screw or requiring the greater portion thereof to be made of special or hard steel it being understood that longer screws require larger diameters to maintain a given strength. Further, the feed screw receives the special end pieces as continuations which in no way add to the diameter of the screw or present any special problems for its installation or adaptation to the ball circuit. Further, the end pieces conform to the intermediate portion of the feed screw while making possible the provision of durable walls for the impact and frictional passage of the balls entering and leaving the feed screw. Further, the faster pitch or coarser threads of the end pieces plus the slightly wider threads provide a feature of benefit in the receiving end of the feed screw, insuring the undeterred entrance of the balls in case the course or the timing of their delivery into the feed screw becomes inaccurate at any time. Further, the slightly widened entrance thread allows room for foreign matter accompanying the travel of the balls without jamming them in the screw thread. Although the widening factor is not practicable for the regular thread of the feed screw, since the cumulative length of the thread would not only render the feed screw unnecessarily long and more expensive, but the latitude afforded the balls would create a timing error in the control of the character-forming mechanism when used with a sign or other apparatus. Finally, the terminal variation in the feed screw retains the general detail and form thereof as a single unit, and accomplishes the added function described without the need of extra parts or additional operations during its use.

It is understood that my improvement need not necessarily be applied to both ends of a given feed screw, and when desired may be applied at one end only. Also, while I have described the invention along specific lines, various minor changes or refinements may be made therein without departing from its principle, and I reserve the right to employ all such changes and refinements as may come within the scope and spirit of the appended claims.

I claim:

1. Means for conveying a series of elements from a receiving zone to a discharging zone with uniform accuracy, comprising a feed screw having thread grooves and walls for receiving the elements in close meshing relation, the intermediate portion of the screw having its thread walls extending substantially to an edge in order to keep said portion and consequently the entire screw at minimum length, and a terminal portion of said feed screw having its thread groove defining a relatively wider and less close meshing relation with said elements.

2. The structure of claim 1, all the threads of the terminal portion having a uniformly thicker edge and faster pitch than that of the intermediate portion in order to accommodate such thicker edge without appreciably lengthening the screw.

3. Electric selective apparatus having means for selectively feeding, in response to electric signals, a series of elements comprising a feed screw the major portion of which is disposed between terminal portions and having thread grooves and walls adapted to receive and convey said elements in selected formation, the thread groove on the major portion of the screw length being of a given width, and a terminal portion of said feed screw having a wider thread-groove, said feeding means being associated with such wider thread-groove of said terminal portion to feed the elements therein.

4. Electric selective apparatus having means for selectively feeding, in response to electric signals, a series of balls comprising a feed screw the major portion of which is disposed between terminal portions and having thread grooves and walls adapted to receive and convey said balls in accurate signal formation, the thread on the major portion of the screw length being of a given pitch, and a terminal portion of said feed screw having a thread-groove of greater width and faster pitch to permit more freedom of passage for the balls in said terminal portion, said feeding means being associated with the thread of said terminal portion to selectively feed the balls therein.

5. Electric selective apparatus having means for selectively feeding, in response to electric signals, a series of elements and comprising a feed screw the major portion of which is disposed between terminal portions, said major portion having thread grooves and walls adapted to receive and convey said elements in selected formation, the thread on the major portion of the screw length being of a given diameter, with the thread groove of a given width, and a terminal portion of said feed screw having threads of the same diameter but with a wider thread-groove, said feeding means being associated with such wider thread-groove of said terminal portion to feed the elements therein, the thread-groove throughout said major portion of the screw length being of uniform width, said terminal portion of the feed screw being removably secured thereto, all of said wider thread-grooves in said terminal portion being of uniform width, said terminal portion secured rotatively to said major portion so that a blending of the different-width thread-grooves of each is effected to present a continuous conveyance and smooth groove for said elements.

References Cited in the file of this patent

UNITED STATES PATENTS

| | | |
|---|---|---|
| 2,309,418 | Schweickart | Jan. 26, 1943 |
| 2,461,277 | Hohl et al. | Feb. 8, 1949 |
| 2,610,739 | Bitzer | Sept. 16, 1952 |
| 2,817,703 | Naxon | Dec. 24, 1957 |
| 2,829,757 | Breeback | Apr. 8, 1958 |